United States Patent
Chen et al.

(10) Patent No.: US 8,345,623 B2
(45) Date of Patent: *Jan. 1, 2013

(54) UNIFIED SYNCHRONOUS RANGING CHANNEL DESIGN AND ALLOCATION IN WIRELESS OFDMA SYSTEMS

(75) Inventors: Yih-Shen Chen, Hsinchu (TW); Pei-Kai Liao, Mingjian Xiang (TW)

(73) Assignee: Mediatek Inc. (TW)

( * ) Notice: Subject to any disclaimer, the term of this patent is extended or adjusted under 35 U.S.C. 154(b) by 451 days.

This patent is subject to a terminal disclaimer.

(21) Appl. No.: 12/653,360

(22) Filed: Dec. 11, 2009

(65) Prior Publication Data

US 2010/0150100 A1    Jun. 17, 2010

Related U.S. Application Data

(60) Provisional application No. 61/121,916, filed on Dec. 12, 2008, provisional application No. 61/218,112, filed on Jun. 18, 2009, provisional application No. 61/233,533, filed on Aug. 13, 2009, provisional application No. 61/236,201, filed on Aug. 24, 2009, provisional application No. 61/243,595, filed on Sep. 18, 2009.

(51) Int. Cl.
    *H04Q 7/00*    (2006.01)
(52) U.S. Cl. ........................................ 370/330
(58) Field of Classification Search ................ None
    See application file for complete search history.

(56) References Cited

U.S. PATENT DOCUMENTS

| | | | | |
|---|---|---|---|---|
| 8,098,713 B2 * | 1/2012 | Baxley et al. | ............... | 375/145 |
| 8,107,428 B2 * | 1/2012 | Chong et al. | ............... | 370/329 |
| 2002/0159422 A1 * | 10/2002 | Li et al. | ............... | 370/342 |
| 2005/0195791 A1 | 9/2005 | Sung et al. | ............... | 370/342 |
| 2006/0098749 A1 | 5/2006 | Sung et al. | ............... | 375/260 |
| 2008/0267303 A1 * | 10/2008 | Baldemair et al. | ............... | 375/260 |
| 2009/0168662 A1 | 7/2009 | Tsuboi et al. | ............... | 370/252 |
| 2010/0135360 A1 | 6/2010 | Kwak et al. | ............... | 375/135 |
| 2011/0002288 A1 | 1/2011 | Lee et al. | ............... | 370/329 |
| 2012/0039272 A1 * | 2/2012 | Lee et al. | ............... | 370/329 |
| 2012/0052899 A1 | 3/2012 | Wang et al. | ............... | 455/513 |

FOREIGN PATENT DOCUMENTS

CN  101217818 A  7/2008
WO  WO2008130165 A1  10/2008

OTHER PUBLICATIONS

International Search Report and Written Opinion of International Search Authority for PCT/CN2009/075512 dated Mar. 18, 2010 (10 pages).
Office Action, for U.S. Appl. No. 12/653,336, dated on Apr. 25, 2012 (10 pages).

* cited by examiner

*Primary Examiner* — Hassan Phillips
*Assistant Examiner* — Prenell Jones
(74) *Attorney, Agent, or Firm* — Imperium Patent Works; Zheng Jin

(57) ABSTRACT

A unified synchronous ranging channel is provided. The unified synchronous ranging channel has a ranging cyclic prefix length that is the same as a cyclic prefix length of a data channel. The unified synchronous ranging channel is used for one of initial ranging, handover ranging, and periodic ranging between a mobile station and a femto base station. In one embodiment, the synchronous ranging channel spans over a two-dimensional radio resource region having a first number of subcarriers along frequency domain, a second number of OFDM symbols along time domain, and a third number of time-domain repetition. At the transmit side, a ranging code sequence is generated by applying a fixed time-domain cyclic shift per OFDM symbol to a root sequence. At the receive side, the ranging code sequence is decoded by using a summation module, a likelihood-combining module, and a modified peak test module that normalizes a peak value.

21 Claims, 13 Drawing Sheets

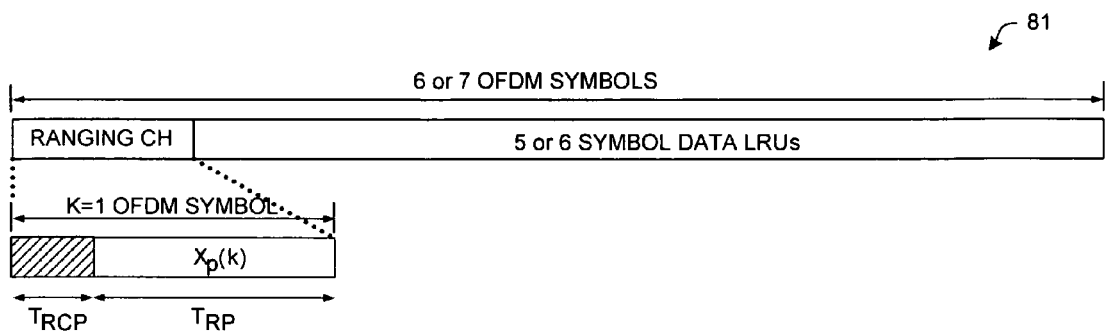
FIG. 8
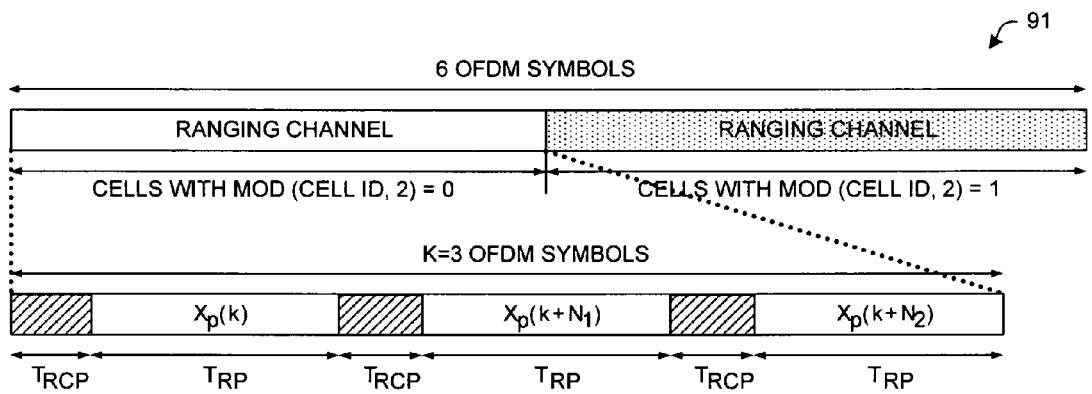
FIG. 9
| CONFIGURATIONS | MULTIPLEXING MODE |
|---|---|
| SFH BIT = 0 | FDM WITH DATA CHANNELS AND TDM/CDM AMONG CELLS<br>72 SUBCARRIERS × $K_1$ OFDM SYMBOLS<br>Cells with mod(cell ID, $p$ ) = $q$ UTILIZE OFDM SYMBOL<br>($q \times K_1$ +1)~($q \times K_1 + K_1$) for RANGING |
| SFH BIT = 1 | FDM WITH DATA CHANNELS AND CDM AMONG CELLS<br>72 SUBCARRIERS × $K_2$ OFDM SYMBOLS |
FIG. 10

UNIFIED SYNCHRONOUS RANGING CHANNEL DESIGN AND ALLOCATION IN WIRELESS OFDMA SYSTEMS

CROSS REFERENCE TO RELATED APPLICATIONS

This application claims priority under 35 U.S.C. §119 from U.S. Provisional Application No. 61/121,916, entitled "Method for Access Femtocells in Wireless OFDMA Systems," filed on Dec. 12, 2008; U.S. Provisional Application No. 61/218,112, entitled "Synchronized Ranging Structure," filed on Jun. 16, 2009; U.S. Provisional Application No. 61/233,533, entitled "Synchronized Ranging Channel Design in OFDMA Systems," filed on Aug. 13, 2009; U.S. Provisional Application No. 61/236,201, entitled "New Synchronized Ranging Channel Design in OFDMA Systems," filed on Aug. 24, 2009; U.S. Provisional Application No. 61/243,595, entitled "A Low Complexity Detection Algorithm for Synchronized Structure," filed on Sep. 18, 2009, the subject matter of which is incorporated herein by reference.

TECHNICAL FIELD

The disclosed embodiments relate generally to wireless OFDMA systems, and, more particularly, to ranging channel design and allocation.

BACKGROUND

In cellular communications systems, physical (PHY) layer synchronization and Media Access Control (MAC) layer synchronization are performed before a mobile station can access a base station. For PHY layer synchronization, timing, frequency and power adjustment are made via Synchronization Channel (SCH) monitoring and tracking during downlink synchronization and via ranging operation during uplink synchronization. For MAC layer synchronization, system information acquisition, capability negotiation and registration are accomplished via network entry procedures. In IEEE 802.16m, three different types of ranging channels are defined. Under a non-synchronized ranging channel, the mobile station adjusts its frequency, timing, and power with its potential serving cell during initial network entry via initial ranging procedure, and adjusts its frequency, timing, and power with its target cell via handover procedure. Under a synchronized raging channel, the mobile station adjusts its frequency, timing, and power with its serving cell via period ranging procedure. Under a bandwidth request (BR) ranging channel, the mobile station sends out transmission intention and requirements during BR ranging procedure.

In order to meet different synchronization and performance requirements, the design and PHY structure of synchronized and non-synchronized ranging channels are different. In general, longer Ranging Cyclic Prefix (RCP) length is required for non-synchronized ranging channels due to longer propagation delay in cell-edge. In addition, subcarrier spacing is modified in non-synchronized ranging channels. FIG. 1 (Prior Art) illustrates a 3-symbol synchronous ranging channel defined in IEEE 802.16e. In FIG. 1, the 3-symbol synchronous ranging channel has a relative short RCP length, and three ranging code sequences are located in three OFDM symbols. FIG. 2 (Prior Art) illustrates two different formats of a non-synchronous ranging channel defined in IEEE 802.16m. In FIG. 2, $T_{RCP}$ is the RCP time length of a ranging channel, and $T_{RP}$ is the time length of the ranging channel signal waveform. As illustrated in FIGS. 1 and 2, the $T_{RCP}$ of a non-synchronous ranging channel is longer than the $T_{RCP}$ of a synchronous ranging channel.

Femtocell is anticipated to be an important feature to support extreme high-speed transmission for next generation 4G systems, especially in indoor environments. In femtocell environment, the network coverage is usually less than 30 meters. In addition, a femtocell stays in low-duty mode for most of the time, and normally serves no more than 10 users. While separate design for synchronous ranging and non-synchronous ranging channels may be desirable for macrocells, such separate design may not be desirable for femtocells because of the unique environment of femtocell. It remains a challenge to reduce femtocell complexity, improve spectrum efficiency, and reduce initial network entry latency in femtocell environment, while continue to satisfy various synchronization and performance requirement.

SUMMARY

A unified synchronous ranging channel used for various ranging procedures is provided in cellular OFDMA systems. The unified synchronous ranging channel has a ranging cyclic prefix (RCP) length that is the same as a cyclic prefix (CP) length of a data channel. The unified synchronous ranging channel is used for one of initial ranging, handover ranging, and periodic ranging procedure between a mobile station and a femto base station. The same synchronous ranging channel structure can also be used for periodic ranging procedure between a mobile station and a macro base station. By using a unified shorter RCP length for synchronous ranging, non-synchronous ranging, and data transmission, femtocell complexity is reduced because no additional filter is required to split ranging and data OFDM signals. In addition, spectral efficiency is improved by using less radio resource.

In one embodiment, the synchronous ranging channel spans over a two-dimensional radio resource region having a first number of subcarriers along frequency domain, a second number of OFDM symbols along time domain, and a third number of time-domain repetition. In one example, a long ranging code is partitioned into the second number of portions and each portion is allocated to each of the OFDM symbols. The same long ranging code is then repeated in time domain for the third number of times. In one advantageous aspect, longer cell coverage is provided because better code detection is achieved via long code sequence and time domain repetition. In another example, the synchronous ranging channel may be used to transmit a ranging code together with a ranging message for bandwidth request to reduce overall access latency during initial ranging. In addition, the synchronous ranging channel may be frequency division multiplexed (FDM) and/or time division multiplexed (TDM) with other data channels, and code division multiplexed (CDM) and/or TDM among different cells for transmission.

Different ranging procedures have different performance requirements defined under the IEEE 802.16m SRD. Therefore, the unified synchronous ranging channel needs to be allocated more frequent in femtocells than in macrocells in order to meet the stricter HO interruption time requirement for handover procedure. Different ranging channel allocation schemes such as separate allocation, collocated allocation, and hybrid allocation may be used to provide different tradeoffs between spectrum overhead and contention control.

At the transmit side, a ranging code sequence is generated by applying a fixed time-domain cyclic shift per OFDM symbol to a root sequence with a code index. In one advantageous aspect, the symbol-based time-domain cyclic shift scheme reduces detection complexity for a decoder because it requires frequency domain correlation between only root sequences at the receiver side to identify which code sequence is transmitted.

At the receive side, the ranging code sequence is decoded by using a summation module, a likelihood-combining module, a modified peak test module that normalizes a peak value, and a detection module. In one novel aspect, the time-domain values of the code sequence portions of each OFDM symbol are added up one-by-one on the corresponding index for each code index by the summation module to form a likelihood vector. The peak value of the likelihood vector represents a likelihood value of a possible code sequence. If the normalized peak value of a code index is larger than a corresponding threshold value, then that code index is obtained by the detection module. In one advantageous aspect, by normalizing the peak value, the same threshold value can be used for the code index.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 5-9 illustrate various embodiments of a unified synchronous ranging channel.

FIG. 10 illustrates a signaling scheme to distinguish the different configuration modes of a synchronous ranging channel.

DETAILED DESCRIPTION

Reference will now be made in detail to some embodiments of the invention, examples of which are illustrated in the accompanying drawings.

Figure 1:
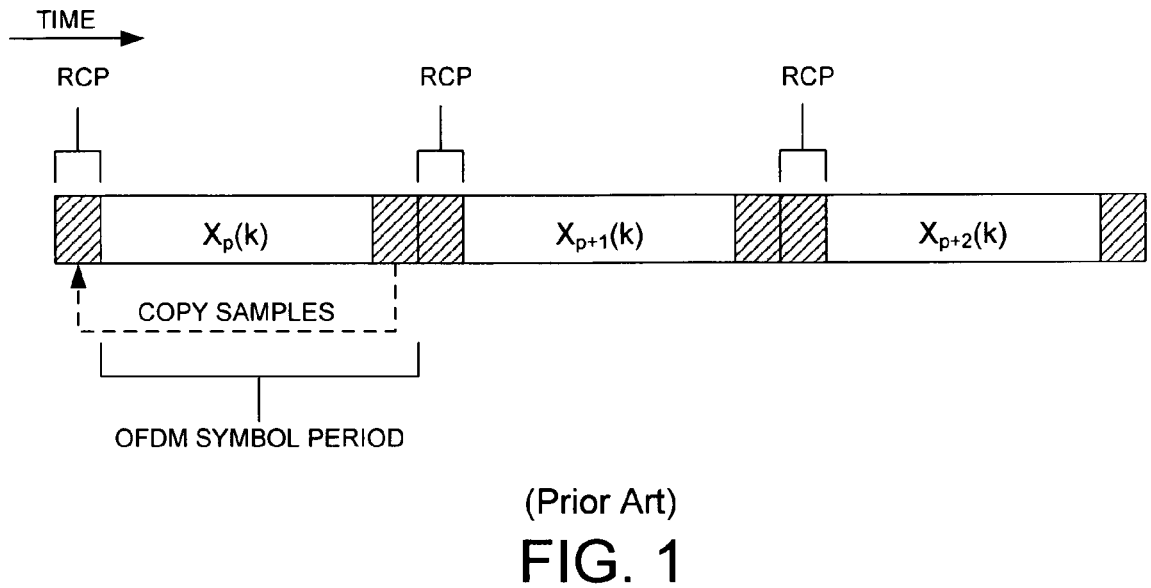
FIG. 1 (Prior Art) illustrates a 3-symbol synchronous ranging channel defined in IEEE 802.16e.
Figure 2:
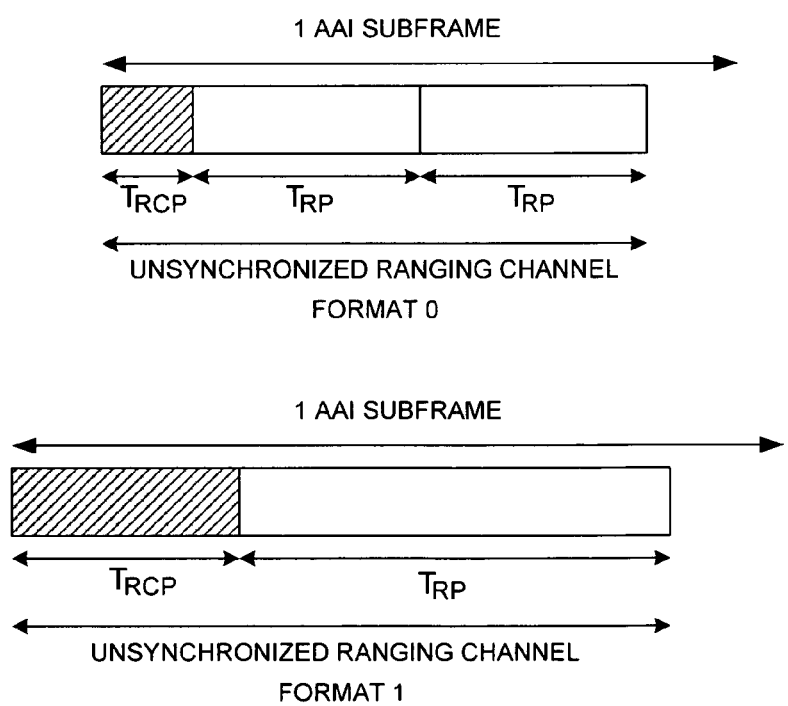
FIG. 2 (Prior Art) illustrates two different formats of a non-synchronous ranging channel defined in IEEE 802.16m.
Figure 3:
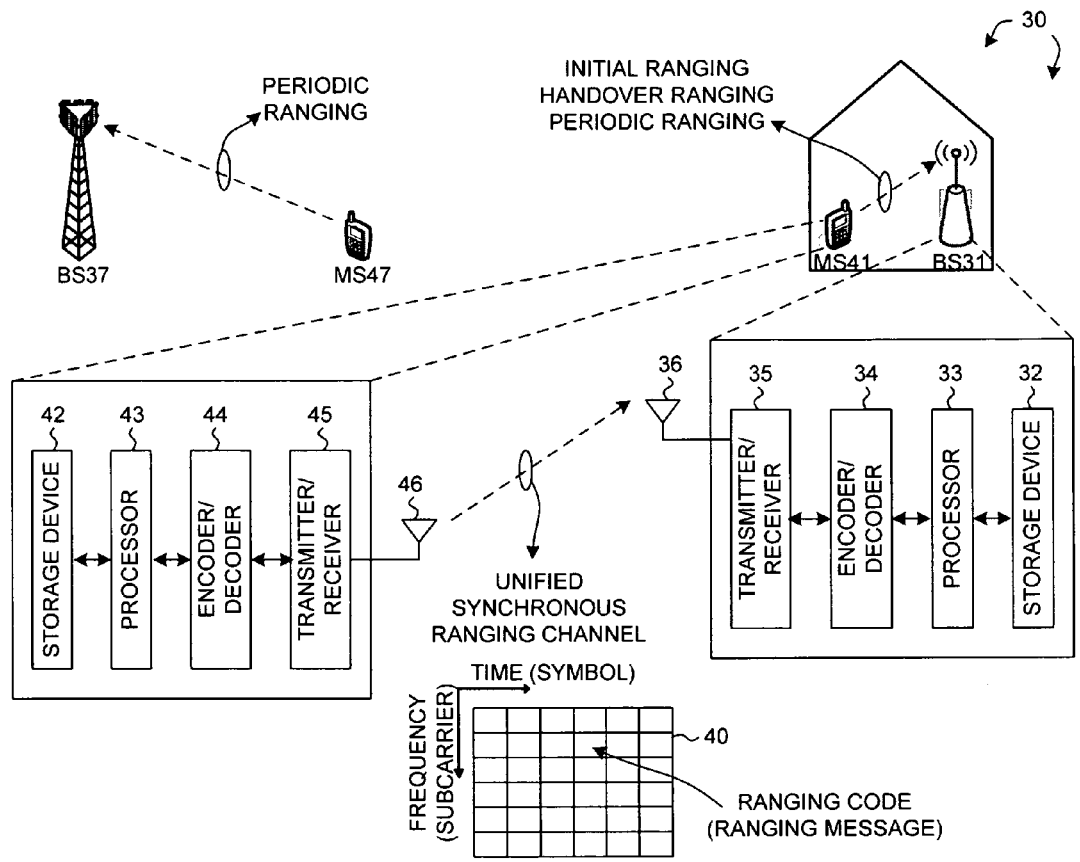
FIG. 3 illustrates a cellular orthogonal frequency division multiple access (OFDMA) system in accordance with one novel aspect.

FIG. 3 illustrates a cellular orthogonal frequency division multiple access (OFDMA) system 30 in accordance with one novel aspect. Cellular OFDMA system 30 comprises a femto base station BS31, a macro base station BS37, and two mobile stations MS41 and MS47. Femto base station BS31 comprises a storage device 32, a processor 33, an encoder/decoder module 34, and a radio frequency (RF) transmitter/receiver module 35 coupled to an antenna 36. Similarly, mobile station MS41 comprises a storage device 42, a processor 43, an encoder/decoder module 44, and an RF transmitter/receiver module 45 coupled to an antenna 46. Femto BS31 is the potential serving base station for mobile station MS41. Upon power-on, MS41 acquires downlink (DL) synchronization by monitoring and tracking Synchronization channel (SCH) and then decoding Super Frame Header (SFH) information broadcasted by BS31. After DL synchronization, MS41 performs uplink (UL) synchronization with BS31 to adjust time, frequency and power via initial ranging procedure. During initial ranging, MS41 transmits an initial ranging code to BS31 and receives an UL grant from BS31. MS41 then transmits a ranging request (RNG_REQ) message to BS31 and receives a ranging response (RNG_RSP) from BS31 to perform network entry procedure. In addition to initial ranging and network entry procedure, a mobile station may also perform other ranging procedures such as handover (HO) ranging with a target base station (i.e., another femto base station) for handover, and periodic ranging with its potential serving base station for maintenance and management.

In one novel aspect, the initial ranging, handover ranging, and periodic ranging procedures between a mobile station and a femto base station are all performed via a unified synchronous ranging channel structure. The unified synchronous ranging channel has a Ranging Cyclic Prefix (RCP) length that is equal to a normal Cyclic Prefix (CP) length of a data channel. In addition, the same unified synchronous ranging channel can be used to perform periodic ranging between a mobile station and a macro base station (i.e., between MS47 and BS37). As illustrated in FIG. 3, a unified synchronous ranging channel 40 comprises a two-dimensional radio resource region that spans over a plurality of frequency tones (subcarriers) along frequency domain and a plurality of time slots (OFDM symbols) along time domain. A ranging code, optionally together with a ranging message, is transmitted via the unified synchronous ranging channel. Within the radio resource region, a long ranging code sequence is partitioned into multiple portions and each portion is allocated to a corresponding OFDM symbol. The same ranging code sequence may also be repeated along the time domain. Detailed embodiments and examples of the unified synchronous ranging channel, ranging channel physical structure, ranging channel allocation scheme, ranging code sequence generation, and ranging code sequence detection are now described below in accordance with the present invention.

Unified Synchronous Ranging Channel

Figure 4:
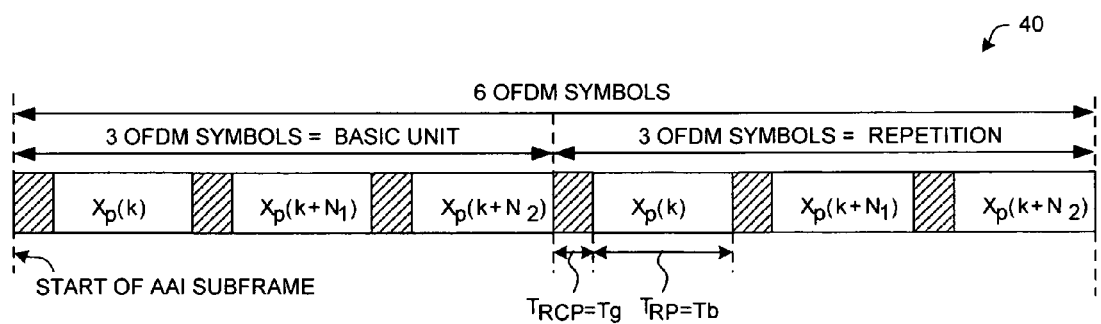
FIG. 4 illustrates a time domain representation of a unified synchronous ranging channel in accordance with one novel aspect.

FIG. 4 illustrates a time domain representation of unified synchronous ranging channel 40 in accordance with one novel aspect. Ranging channel 40 comprises a basic unit and a time-domain repetition. In general, a basic unit comprises a first number of subcarriers (i.e., N=72, not shown) along the frequency domain and a second number (i.e., K=3) of OFDM symbols along the time domain. The same basic unit is then repeated along the time domain for a third number (i.e., Q=2) of repetitions. A long ranging code sequence $X_P$ is partitioned into K portions (i.e., $X_P(k)$, $X_P(k+N_1)$, and $X_P(k+N_2)$, where p is the code index, k is the subcarrier index, and $0<N_1<N_2$) and allocated to each of the K OFDM symbols. The same long ranging code sequence $X_P$ is then repeated in time domain for Q repetitions. By using a long code sequence, lower peak cross-correlation or lower average cross-correlation among available code sequences is provided. By repeating the same long code sequence in time domain, larger cell coverage and better performance in high mobility environment is supported. In the example of FIG. 4, the basic unit comprises 72 (N=72) subcarriers and 3 OFDM symbols (K=3), and is repeated along the time domain for two repetitions (Q=2).

In one advantageous aspect, the RCP time length $T_{RCP}$ of the unified synchronous ranging channel is equal to the normal CP time length $T_{CP}$ (i.e., the guard interval time length Tg) of a data channel; and the time length $T_{RP}$ of the ranging signal waveform is equal to the time length Tb of the data signal waveform. In conventional ranging channel design, initial ranging and handover ranging procedures are performed by using non-synchronized ranging channels, while periodic ranging procedure are performed by using synchronized ranging channels. Typically, $T_{RCP}$ of a non-synchronized ranging channel is generally much longer than Tg due to longer propagation delay in cell edge. However, in some network environments, the CP length (Tg) of an OFDMA symbol is long enough to absorb the distance propagation effect. That is, additionally longer RCP is unnecessary. For example, in femtocell environment, the cell coverage is usually less than 30 meters. The round trip delay (RTD) between a mobile station and a femto base station is thus less than 0.2 uS ($(2*30)/(3*10^8)=0.2$ uS). In IEEE 802.16m, it is required that "all UL OFDMA symbols arrive time coincident at the BS to an accuracy of ±25% of the minimum guard-interval or better." Therefore, after DL synchronization with the femtocell base station, the maximum offset of the mobile station is usually within the synchronization requirement under IEEE 802.16m. As a result, longer RCP length is not necessary in femtocell environment. By using a unified shorter RCP length for synchronous ranging, non-synchronous ranging, and data transmission, femtocell complexity is reduced because no additional filter is required to split ranging and data OFDM signals. In addition, spectral efficiency is improved by using less radio resource.

Ranging Channel Physical Structure

A unified synchronous ranging channel may be used to transmit only a ranging code, or to transmit a ranging code together with a ranging message. A unified synchronous ranging channel may be further frequency division multiplexed (FDM) and/or time division multiplexed (TDM) with other data channels in a scheduling interval, and code division multiplexed (CDM) and/or TDM among different cells in a scheduling interval for transmission. FIGS. 5-13 illustrate different embodiments and examples of a unified synchronous ranging channel physical structure and related application.

Figure 5:
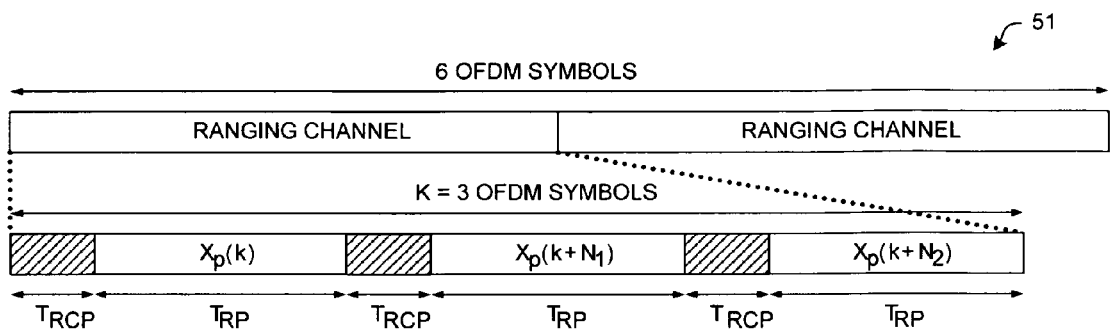

FIG. 5 illustrates a first embodiment of a unified synchronous ranging channel 51. Ranging channel 51 comprises a number of subcarriers (i.e., 72 subcarriers, not shown) and three OFDM symbols (K=3) without any time-domain repetition (Q=1), in which a ranging code sequence $X_P$ is partitioned into three portions (i.e., $X_P(k)$, $X_P(k+N_1)$, and $X_P(k+N_2)$) and allocated to each of the three OFDM symbols. Because ranging channel 51 spans over three OFDM symbols, two ranging channels may be allocated within a six-symbol long subframe. Different mobile stations may use different ranging channels for ranging access and thus reduce ranging collision.

Figure 6:
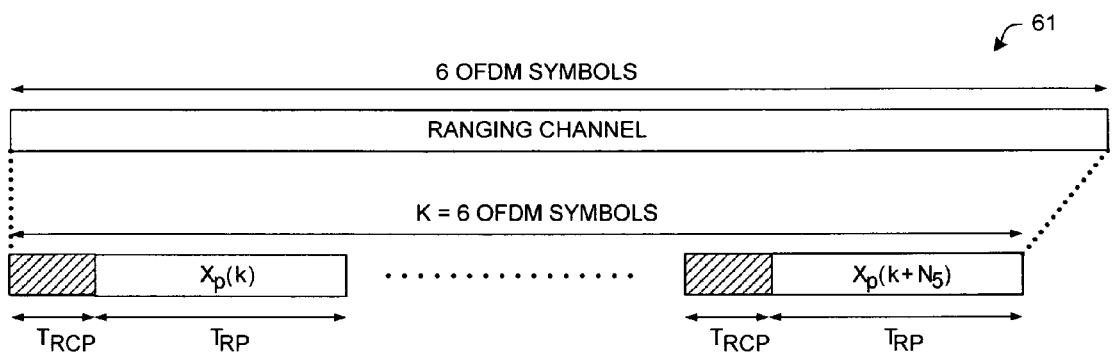

FIG. 6 illustrates a second embodiment of a unified synchronous ranging channel 61. Ranging channel 61 comprises a number of subcarriers (i.e., 72 subcarriers, not shown) and six OFDM symbols (K=6) without any time-domain repetition (Q=1), in which a ranging code sequence $X_P$ is partitioned into six portions (i.e., $X_P(k)$, $X_P(k+N_1)$ ... $X_P(k+N_5)$) and allocated to each of the six OFDM symbols. Because ranging channel 61 spans over six OFDM symbols, only one ranging channel may be allocated within a six-symbol long subframe. As compared to ranging channel 51 of FIG. 5, although less ranging opportunities are available for mobile stations to perform ranging access, longer cell coverage is provided because a longer code sequence is used for better code detection.

Figure 7:
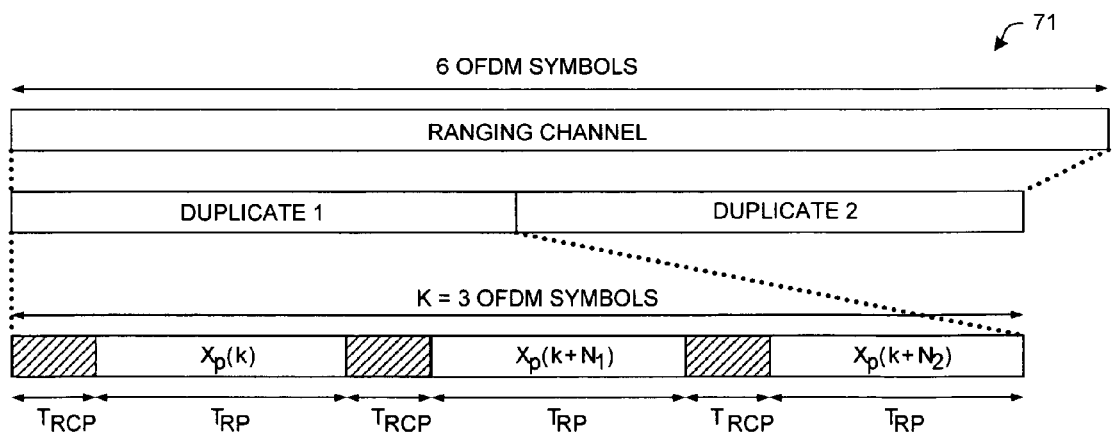

FIG. 7 illustrates a third embodiment of a unified synchronous ranging channel 71. Ranging channel 71 comprises a number of subcarriers (i.e., 72 subcarriers, not shown) and three OFDM symbols (K=3) with two time-domain repetition (Q=2), in which a ranging code sequence $X_P$ is partitioned into three portions (i.e., $X_P(k)$, $X_P(k+N_1)$, and $X_P(k+N_2)$) and allocated to each of the three OFDM symbols (i.e., duplicate 1). The same ranging code $X_P$ is again repeated along the time domain (i.e., duplicate 2). Because ranging channel 71 spans over six OFDM symbols, only one ranging channel may be allocated within a six-symbol long subframe. As compared to ranging channel 61 of FIG. 6, although a relatively shorter code sequence is used, longer cell coverage is provided because better code detection can still be achieved via time-domain repetition and channel diversity gain.

FIG. 8 illustrates a fourth embodiment of a unified synchronous ranging channel 81. Ranging channel 81 spans over one OFDM symbol (K=1) without any time-domain repetition (Q=1), in which a ranging code sequence $X_P$ is allocated to the OFDM symbol. In the example of FIG. 8, ranging channel 81 is further TDM with a five-symbol or six-symbol long data channel within a six-symbol long or seven-symbol long subframe.

FIG. 9 illustrates a fifth embodiment of a unified synchronous ranging channel 91. Although ranging channel 91 looks similar to ranging channel 51 of FIG. 5, the underline physical structures of ranging channels 51 and 91 are different. In the examples of FIGS. 5-8, each cell utilizes all ranging opportunities allocated in one subframe, but different cells use different code sets for periodic ranging over the same synchronous ranging allocation. On the other hand, in the example of FIG. 9, one cell utilizes only a portion of the ranging opportunities for periodic ranging, and the rest of the ranging opportunities are utilized by other cells. Thus, in addition to FDM with other data channels, ranging channel 91 is further CDM and/or TDM among different cells in a scheduling interval for transmission.

FIG. 10 illustrates a signaling scheme to distinguish the different configuration modes of a synchronous ranging channel. In the example of FIG. 10, a ranging channel spans over K2 (=K1xQ) OFDM symbols (K1 OFDM symbol with Q time-domain repetition) and is utilized among p cells. One bit in Super Frame Header (SFH) is broadcasted via a broadcast channel to signal different configuration modes of the ranging channel. If the bit is set to one, then each cell utilizes all ranging opportunities (i.e., all K2 OFDM symbols) for ranging. The ranging channel is FDM with data channels and CDM among cells. If the bit is set to zero, then cells with cell ID matching equation (1)(see Eq. (1) below) utilize OFDM symbols (qxK1+1)~(qxK1+K1) for ranging. The ranging channel is FDM with data channels and CDM/TDM among cells.

$$\text{cell ID mod } p=q \qquad \text{Eq. (1)}$$

Figure 11:
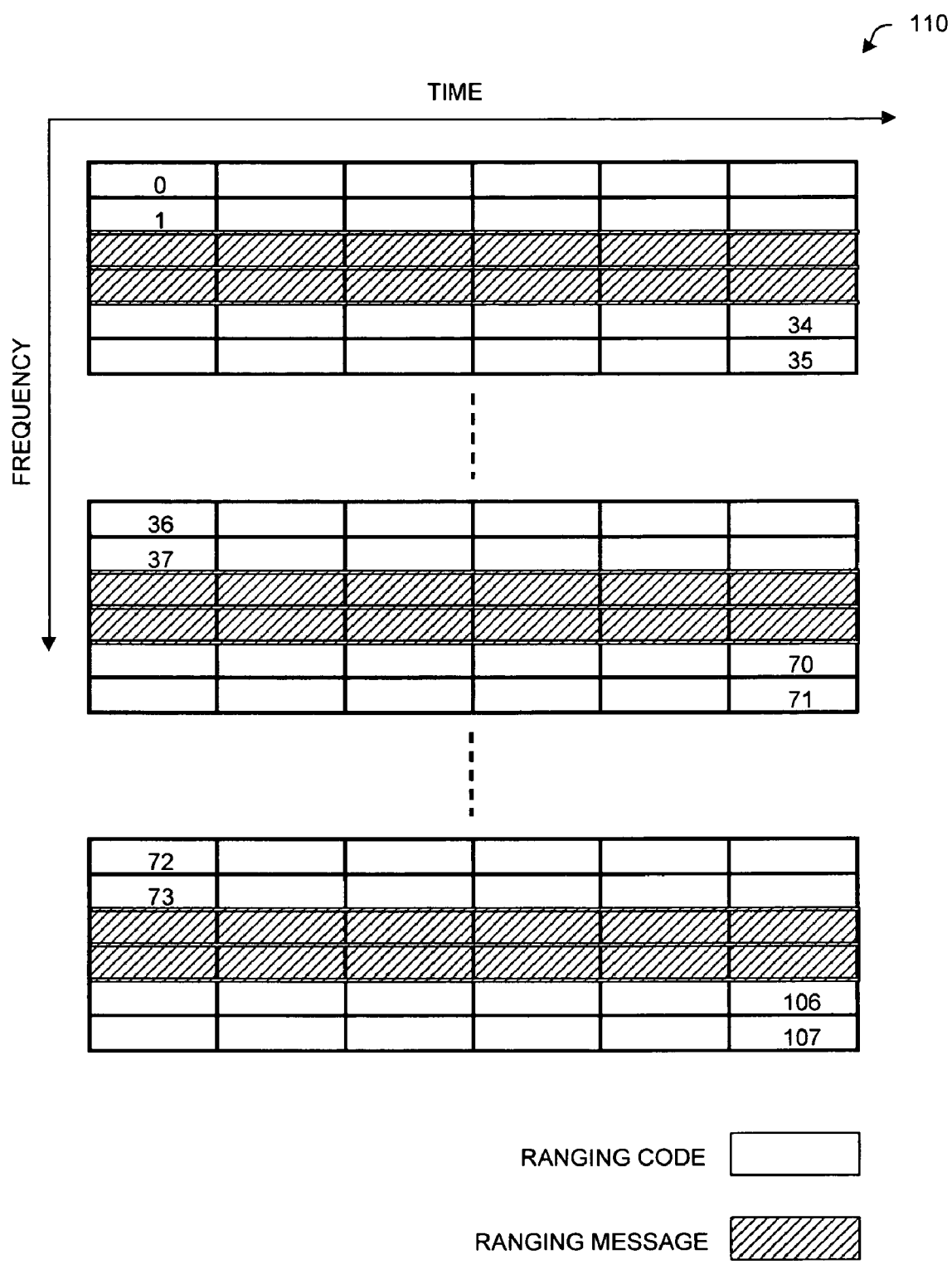
FIG. 11 illustrates a physical structure of a synchronous ranging channel that is used to transmit both a ranging code and a ranging message.

In addition to transmit only a ranging code via a ranging channel structure, both ranging code and ranging message may be transmitted together in the same ranging channel structure. FIG. 11 illustrates a physical structure of a synchronous ranging channel 110 that is used to transmit both a ranging code and a ranging message. In the example of FIG. 11, the ranging code is mapped onto subcarriers denoted with white blocks, while the ranging message is mapped onto subcarriers denoted with shaded blocks. Typically, the ranging message may include information such as the mobile station ID in the femtocell and the bandwidth requirement for the next RNG_REQ to be transmitted by the mobile station. In one advantageous aspect, transmitting a ranging code together with a ranging message may help to reduce access latency and handover interruption time.

Figure 12:
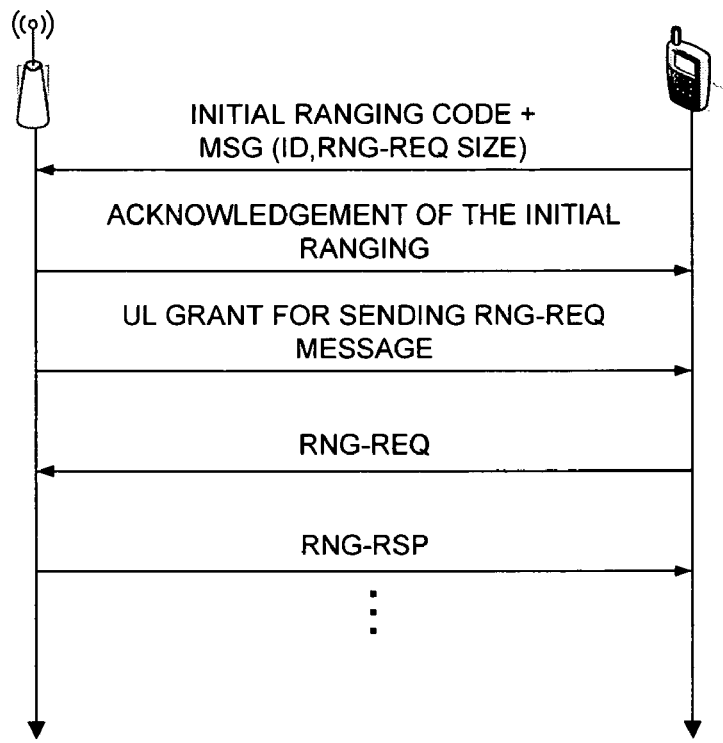
FIG. 12 illustrates a first example of an initial ranging procedure when both ranging code and ranging message are transmitted in the same synchronous ranging channel.

FIG. 12 illustrates a first example of an initial ranging procedure when both ranging code and ranging message for bandwidth request are transmitted in the same synchronous ranging channel. As illustrated in FIG. 12, a mobile station first transmits an initial ranging code and a ranging message for bandwidth request via a synchronous ranging channel to a femto base station. The ranging message comprises the mobile station ID and a ranging request (RNG-REQ) size. The femto base station sends an acknowledgement of the initial ranging back to the mobile station. After correctly decoding the ranging message, the femto base station also sends an UL grant with the requested RNG-REQ size to the mobile station. After receiving the UL grant, the mobile station transmits a RNG-REQ and receives a RNG-RSP back from the femto base station. Because the ranging message for bandwidth request is sent together with the ranging code without using extra steps, the overall access latency is reduced.

Figure 13:
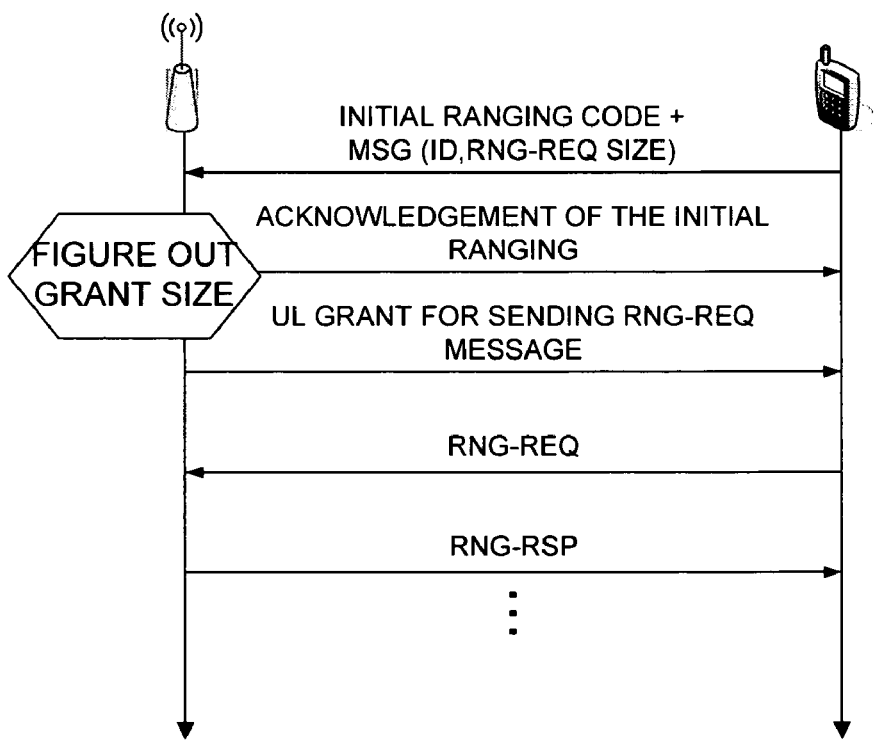
FIG. 13 illustrates a second example of an initial ranging procedure when both ranging code and ranging message are transmitted in the same synchronous ranging channel.

FIG. 13 illustrates a second example of an initial ranging procedure when both ranging code and ranging message for bandwidth request are transmitted in the same synchronous ranging channel. Similar to the ranging procedure in FIG. 12, a ranging code together with a ranging message for bandwidth request is transmitted by a mobile station to a femto base station via a synchronous ranging channel. In the example of FIG. 13, however, the ranging message is not correctly decoded by the femto base station. The procedure falls back to conventional initial ranging procedure. As a result, the femto base station has to figure out the requested RNG-REQ size when sending an UL grant to the mobile station. If the granted RNG-REQ size is too small, then the mobile station has to restart the initial ranging and the overall access latency is increased. Under proper ranging channel allocation, the probability for fallback mode would be very low.

Ranging Channel Allocation

While the proposed unified synchronous ranging channel may be used for different ranging procedures including initial ranging, handover ranging, and periodic ranging in femtocell environment, it is used only for periodic ranging in macrocell environment. Different ranging procedures have different performance requirements defined under the IEEE 802.16m SRD. For initial ranging procedure, the idle-to-active latency requirement is 100 mille seconds. For handover procedure, the HO interruption time requirement of intra-frequency HO is 27.5 mille seconds, and the HO interruption time requirement of inter-frequency HO is 40 mille seconds within the same spectrum band and 60 mille seconds between different spectrum bands. Therefore, the unified synchronous ranging channel needs to be allocated more frequent in femtocells than in macrocells in order to meet the stricter HO interruption time requirement for handover procedure. Shorter allocation periodicity of the ranging channel, however, will increase the overall spectrum overhead in femtocells. Different embodiments and examples of ranging channel allocation schemes are now described below with more details.

Figure 14:
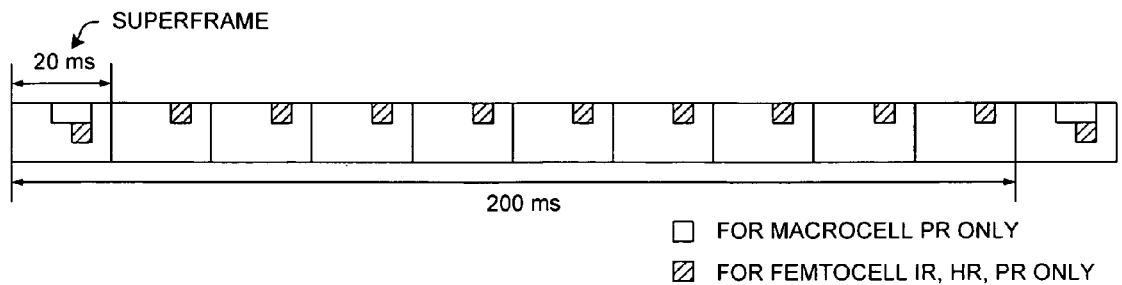
FIG. 14 illustrates a separate ranging channel allocation scheme for macrocells and femtocells.

FIG. 14 illustrates a separate ranging channel allocation scheme for macrocells and femtocells. In the example of FIG. 14, macrocells and femtocells allocate their own ranging channels separately. For macrocells, one ranging channel is allocated in every ten superframes (i.e., 200 ms) for periodic ranging (PR). For femtocells, one ranging channel is allocated in every one superframe (i.e., 20 ms) for initial ranging (IR), handover ranging (HR), and periodic ranging (PR). Because ranging channels are allocated separately and independently by macrocells and femtocells without negotiation with each other, such separate ranging channel allocation scheme may result in higher overhead.

Figure 15:
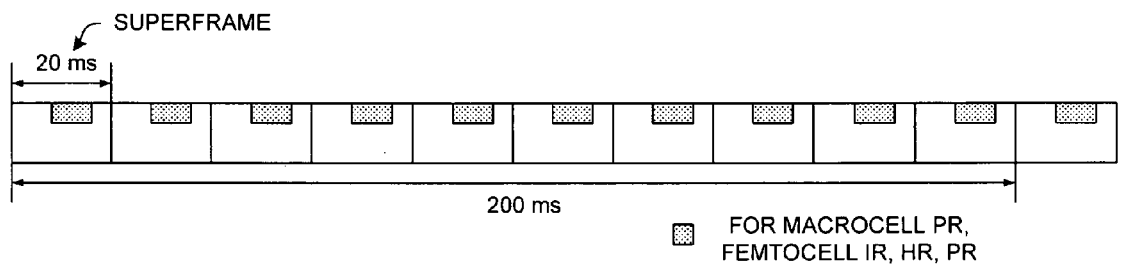
FIG. 15 illustrates a collocated ranging channel allocation scheme for macrocells and femtocells.

FIG. 15 illustrates a collocated ranging channel allocation scheme for macrocells and femtocells. In the example of FIG. 15, both macrocells and femtocells allocate one ranging channel every one superframe. Because all ranging channels are shared among macrocells and femtocells, such collocated ranging channel allocation scheme may result in higher contention.

Figure 16:
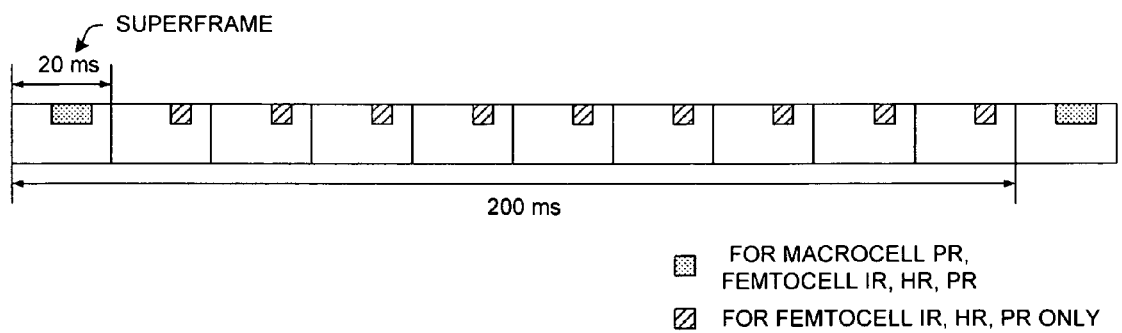
FIG. 16 illustrates a hybrid ranging channel allocation scheme for macrocells and femtocells.

FIG. 16 illustrates a hybrid ranging channel allocation scheme for macrocells and femtocells. In the example of FIG. 16, femtocells allocate ranging channels more frequent (i.e., one ranging channel in every 20 ms) than macrocells (i.e., one ranging channel in every 200 ms). However, macrocells and femtocells negotiate with each other such that ranging channels allocated by macrocells overlap with part of the ranging channels allocated by femtocells. Because some allocations are shared by macrocells and femtocells and other allocations are for femtocells only, such hybrid ranging channel allocation scheme is able to provide better contention control with less overhead.

Ranging Code Sequence Generation

Figures 17A, 17B, 17C:
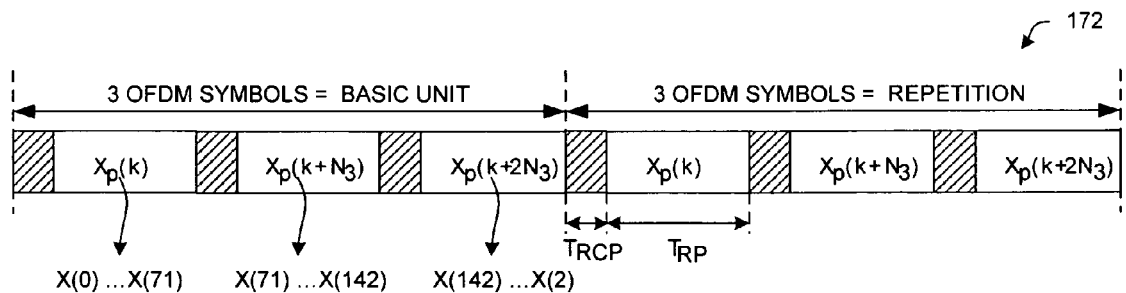
FIG. 17A illustrates a frequency-domain representation of a ranging preamble code that is mapped onto a unified synchronous ranging channel.
FIG. 17B illustrates a frequency-domain representation of a ranging preamble code that is mapped onto a unified synchronous ranging channel with time-domain repetition.
FIG. 17C illustrates a time-domain representation of a ranging preamble code that is mapped onto a unified ranging channel with time-domain repetition.

FIG. 17A illustrates a frequency-domain representation of a ranging preamble code $X_P$ that is mapped onto a unified synchronous ranging channel 171. The ranging preamble code $X_P$ comprises a long code sequence $X_P(k)$, where k=0, 1, $N_1-1$, and $N_1$ is the code sequence length (i.e., $N_1$=211). The ranging channel comprises a radio resource region that spans over 72 subcarriers and 3 OFDM symbols. As illustrated in FIG. 17A, each $X_P(k)$ (i.e., may be either a binary value or a complex value) is allocated into a corresponding subcarrier and OFDM symbol within the radio resource region of the ranging channel. FIG. 17B illustrates a frequency-domain representation of the same ranging preamble code $X_P$ that is mapped onto a unified synchronous ranging channel 172 with time-domain repetition. Similar to FIG. 17A, ranging code sequence $X_P(k)$ is allocated into a 72×3 resource region of the ranging channel. The same long ranging code sequence $X_P(k)$ is then repeated in time domain.

FIG. 17C illustrates a time-domain representation of the ranging preamble code $X_P$ that is mapped onto unified ranging channel 172 in FIG. 17B. As illustrated in FIG. 17C, the long ranging preamble code $X_P$ is partitioned into three portions (i.e., $X_P(k)$, $X_P(k+N_3)$, and $X_P(k+2N_3)$) and allocated to each of the three OFDM symbols. More specifically, $X_P(k)$ represents a first code segment of code sequence "$X_P(0) \ldots X_P(71)$", $X_P(k+N_3)$ represents a second code segment of code sequence "$X_P(71) \ldots X_P(142)$", and $X_P(k+2N_3)$ represents a third code segment of code sequence "$X_P(142) \ldots X_P(2)$", where $N_3$ is the code segment length in the frequency domain (i.e., $N_3=72$). The same ranging code $X_P$ is then repeated in time domain.

One typical example of a ranging code is a Zadoff-Chu sequence. A Zadoff-Chu sequence is a complex-valued mathematical sequence that gives rise to an electromagnetic signal of constant amplitude when applied to radio signals. A generated Zadoff-Chu sequence that has not been shifted is known as a "root sequence." In order to provide more code sequences to be used for ranging access at the transmit side, time-domain cyclic Zadoff-Chu code sequences are typically generated by time-domain cyclic shifting a Zadoff-Chu root sequence. A cyclic-shifted version of a Zadoff-Chu sequence does not cross-correlate with each other when the radio signals are recovered at the receiver side. In addition, code sequences generated by time-domain cyclic shifting based on the same root sequence are orthogonal to each other.

In one example, code-based time-domain cyclic-shifted versions of a Zadoff-Chu sequence may be generated by the following equation (2):

$$X_p(k) = \exp\left(-j*\pi \frac{r_p*k*(k+1)+2*k*s_p*Ncs}{N_1}\right), \quad \text{Eq. (2)}$$
$$k = 0, 1, \ldots, N_2$$

where p is the ranging code index, $r_p$ is the root index of the Zadoff-Chu sequence, $N_1$ is the code length of the Zadoff-Chu sequence, $N_2$ is the ranging preamble length, Ncs is the number of cyclic-shift samples applied for the generation of cyclic ranging codes, and $s_p$ is the number of multiple Ncs applied to generate cyclic ranging code with index p.

Figure 18:
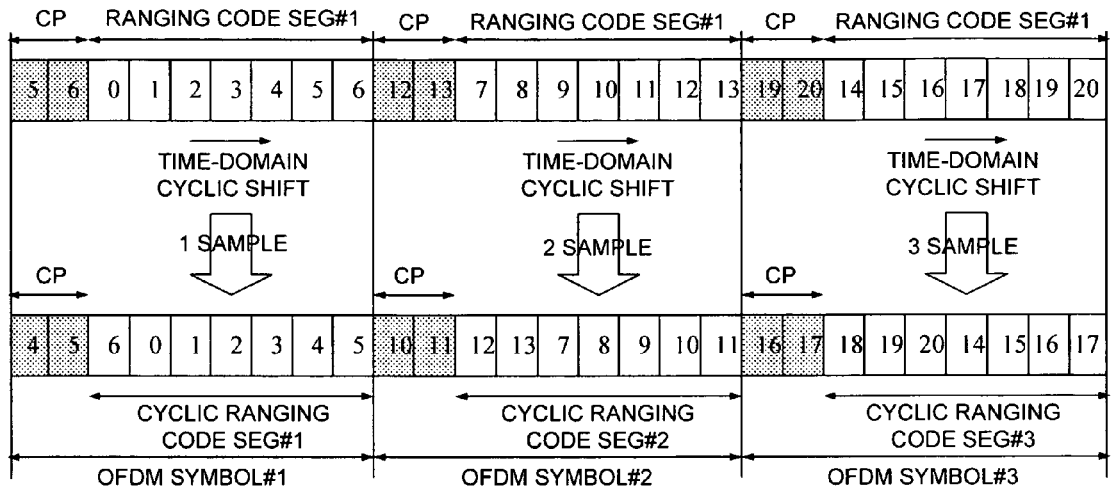
FIG. 18 (Prior Art) illustrates a time-domain representation of a Zadoff-Chu root sequence and a code-based time-domain cyclic-shifted sequence.

FIG. 18 (Prior Art) illustrates a time-domain representation of a Zadoff-Chu root sequence and a time-domain cyclic-shifted code sequence under Equation (2). Base on Equation (2), cyclic code sequences are generated by applying time domain cyclic shift of ($2*k*s_p*N_{CS}$) to a Zadoff-Chu root sequence. In FIG. 18, the top portion represents a Zadoff-Chu root sequence and the bottom portion represents a cyclic-shifted Zadoff-Chu sequence. In OFDM symbol #1, ranging code segment#1 "0, 1, 2, 3, 4, 5, 6" represents the time-domain sample values of the first code segment (i.e., $X_P(k)$) in frequency domain. In OFDMS symbol #2, ranging code segment#2 "7, 8, 9, 10, 11, 12, 13" represents the time-domain sample values of the second code segment (i.e., $X_P(k+N_3)$) in frequency domain. In OFDM symbol #3, ranging code segment#3 "14, 15, 16, 17, 18, 19, 20" represents the time-domain sample values of the third code segment (i.e., $X_P(k+2N_3)$) in frequency domain. Because the number of samples to be shifted for each code segment is based on the value of index k, each code segment in a different OFDM symbol is cyclic shifted by a different number of samples. In the example of FIG. 18, code segment#1 is shifted by one sample to become "6, 0, 1, 2, 3, 4, 5", code segment#2 is shifted by two samples to become "12, 13, 7, 8, 9, 10, 11", and code segment#3 is shifted by three samples to become "18, 19, 20, 14, 15, 16, 17". As a result, the code-based time-domain cyclic shift scheme introduces more detection complexity for a decoder because it requires frequency domain correlation between all possible cyclic code sequences at the receiver side to identify which cyclic code sequence is transmitted.

In one novel aspect, symbol-based time-domain cyclic code sequences of a Zadoff-Chu root sequence may be generated by the following equations (3) or (4):

$$X_p(k) = \exp\left(-j*\pi \frac{r_p*k*(k+1)+2*\mathrm{mod}(k,N_3)*s_p*Ncs}{N_1}\right), \quad \text{Eq. (3)}$$
$$k = 0, 1, \ldots, N_2$$

where p is the ranging code index, $r_p$ is the root index of the Zadoff-Chu sequence, $N_1$ is the code length of the Zadoff-Chu sequence, $N_2$ is the ranging preamble length, $N_3$ is the applied code segment length in the frequency domain, Ncs is the number of cyclic-shift samples applied for the generation of cyclic ranging codes, and $s_p$ is the number of multiple Ncs applied to generate cyclic ranging code with index p.

$$X_p(n,k) = \exp\left(-j*\pi\left(\frac{r_p*(n*71+k)*(n*71+k+1)}{N_1} + \frac{2*k*s_p*Ncs}{N_{FFT}}\right)\right), \quad \text{Eq. (4)}$$
$$k = 0, 1, \ldots, N_3-1, n = 0, 1, 2$$

where n is the OFDM symbol index, $N_{FFT}$ is the FFT size, and the rest of the terms have the same meaning as the terms in Equation (2). Although Equation (3) and (4) are different in forms, the generated cyclic-shifted code sequences $X_P(k)$ and $X_P(n,k)$ are the same in substance.

Figure 19:
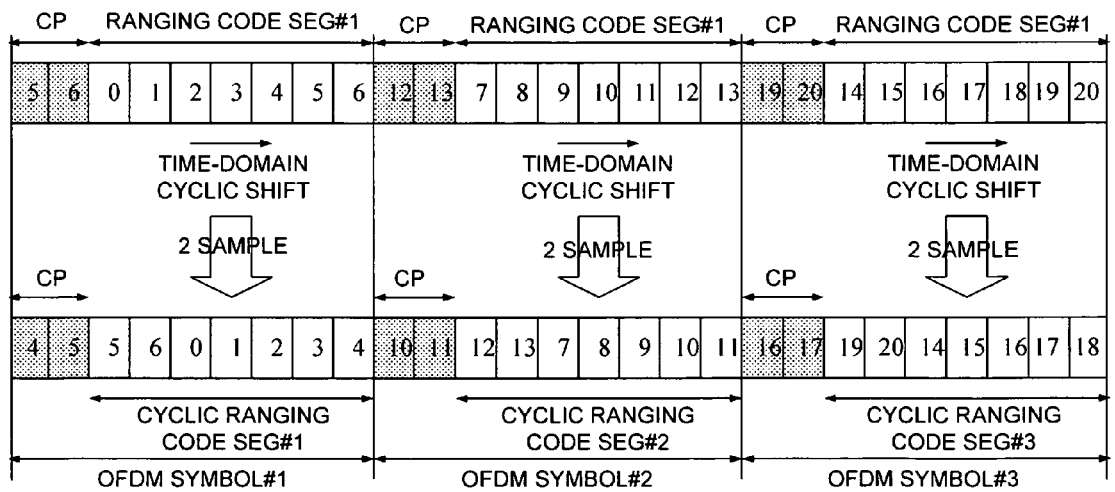
FIG. 19 illustrates a time-domain representation of a Zadoff-Chu root sequence and a symbol-based time-domain cyclic-shifted sequence in accordance with one novel aspect.

FIG. 19 illustrates a time-domain representation of a Zadoff-Chu root sequence and a time-domain cyclic-shifted code sequence under Equation (3). Base on Equation (3), cyclic code sequences are generated by applying time domain cyclic shift of ($2*\mathrm{mod}(k,N_3)*s_p*N_{CS}$) to a Zadoff-Chu root sequence. The number of samples to be shifted for each code segment is thus based on the value of mod(k,$N_3$), which is the subcarrier index (i.e., 0 to 71) that is reset to zero for every OFDM symbol. As a result, each code segment in a different OFDM symbol is cyclic shifted by the same number of samples. In FIG. 19, the top portion represents different code segments of a Zadoff-Chu root sequence and the bottom portion represents different code segments of a cyclic-shifted Zadoff-Chu sequence. As illustrated in FIG. 19, each code segment in an OFDM symbol is shifted by a fixed number of two samples in time domain. Therefore, the symbol-based time-domain cyclic shift scheme reduces detection complexity for a decoder because it requires frequency domain correlation between only root sequences at the receiver side to identify which code sequence is transmitted. Embodiments and examples on how to detect a code sequence are now described below with more details.

Ranging Code Sequence Detection

Referring back to FIG. 3, mobile station MS41 may perform initial ranging or periodic ranging with its potential serving base station BS31. MS41 may also perform handover ranging with a target base station. At the transmit side, mobile station MS41 generates a ranging code (i.e., a cyclic Zadoff-Chu sequence $X_P$) and transmits the ranging code to femto base station BS31 via unified synchronous ranging channel 40. At the receiver side, BS31 receives the initial ranging code and then detects which ranging code is transmitted from MS41 and estimates the uplink timing offset between MS41 and BS31 by the received ranging code so that the uplink synchronization between MS41 and BS31 can be achieved.

Figure 20:
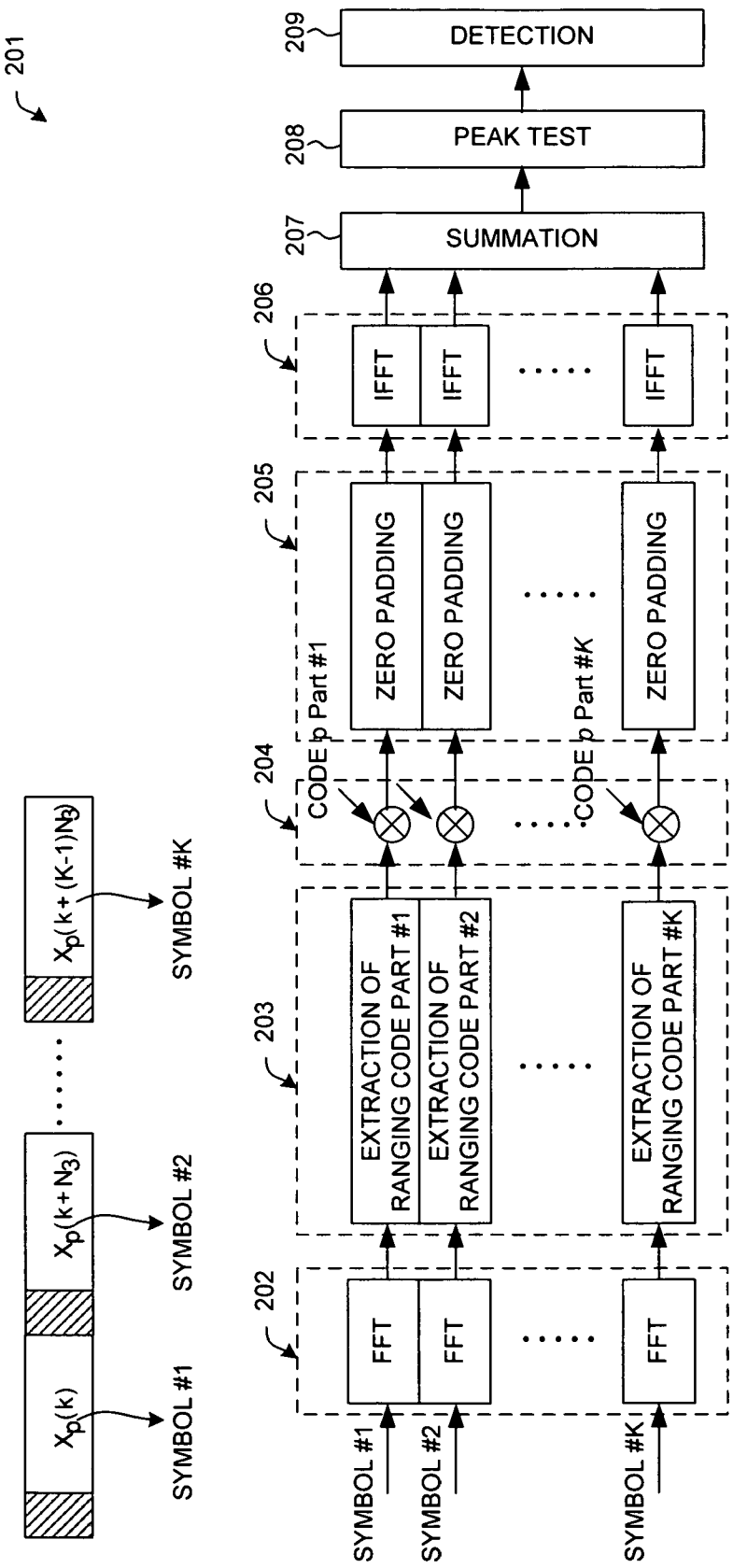
FIGS. 20-23 illustrate various embodiments of a decoder of a base station in accordance with one novel aspect.

FIG. 20 illustrates a first embodiment of a decoder 201 of a base station in accordance with one novel aspect. In the example of FIG. 20, a ranging code sequence $X_P$ and other data that are transmitted via K OFDM symbols in time domain. The ranging code sequence $X_P$ is partitioned into K parts, and each part is allocated in one OFDM symbol and transmitted to decoder 201 in time domain. More specifically, the first part $X_P(k)$, where $k=0, 1, \ldots, N_3-1$, is transmitted via OFDM symbol #1, and the $K^{th}$ part $X_P(k+(K-1)N_3)$, where $k=0, 1, N_3-1$, is transmitted via OFDM symbol #K. Decoder 201 comprises a number of (i.e., K) FFT module 202, extractor 203, correlator 204, zero padder 205, IFFT module 206, a summation module 207, a modified peak test module 208, and a detection module 209. Each code sequence part is transferred from time domain to frequency domain by a corresponding FFT module and extracted from other data by a corresponding extractor. Each extracted code sequence part is then correlated to a corresponding code part of all possible code sequences (i.e., all Zadoff-Chu root sequences) by a corresponding correlator. For example, the first extracted code sequence is correlated to $CODE_P$ part #1, and the $K^{th}$ extracted code sequence is correlated to $CODE_P$ part #K, where $CODE_P$ is a root sequence with code index P. After zero padding, each correlated code sequence part is then transferred back to time domain values by a corresponding IFFT module.

In one novel aspect, the time-domain values of the code sequence parts are then added up one-by-one on the corresponding index for each code index P by summation module 207 to form a likelihood vector. The peak value of the likelihood vector represents a likelihood value $t_p$ of a possible code sequence $CODE_P$. The peak values are then normalized by modified peak test module 208. If a normalized peak value of code index P is larger than a corresponding threshold value, then $CODE_P$ is obtained by detection module 209. If the ranging code sequence $X_P$ is a symbol-based time-domain cyclic Zadoff-Chu sequence based on root sequence $CODE_P$ as described above with respect to FIG. 19, then a timing location of the peak value is also detected by detection module 209. Based on this information, decoder 201 is able to identify the exact cyclic-shifted ranging code sequence $X_P$ based on the root sequence $CODE_P$ transmitted by the mobile station. In addition to the detection of the ranging code, the uplink timing offset between mobile station and base station is estimated such that UL synchronization can be achieved based on the estimated timing offset.

In one advantageous aspect, each peak value $t_p$ is normalized by modified peak test module 208. Because peak values are dependent on different SNR values in different system environment, the threshold value of a code index p may vary based on a particular SNR value in a particular system environment. By normalizing the peak values, the same threshold value can be used for a code index P. For example, the peak values may be normalized by using the following equation (5):

$$\text{Normalization}\{t_p\} = \frac{t_p - \frac{1}{N_C - m} \sum_{i=m}^{N_C-1} t_i}{\sqrt{\frac{1}{N_C - m} \sum_{i=m}^{N_C-1} \left(t_i - \frac{1}{N_C - m} \sum_{j=m}^{N_C-1} t_j\right)^2}} \quad \text{Eq. (5)}$$

Pr (Normalization $\{t_p\}>T|$ there is no code sequence transmitted)$<=P_{FA}$, where $N_c$ is the number of code sequences, m is the maximal possible transmitted code sequences, and p is the code index.

Figure 21:
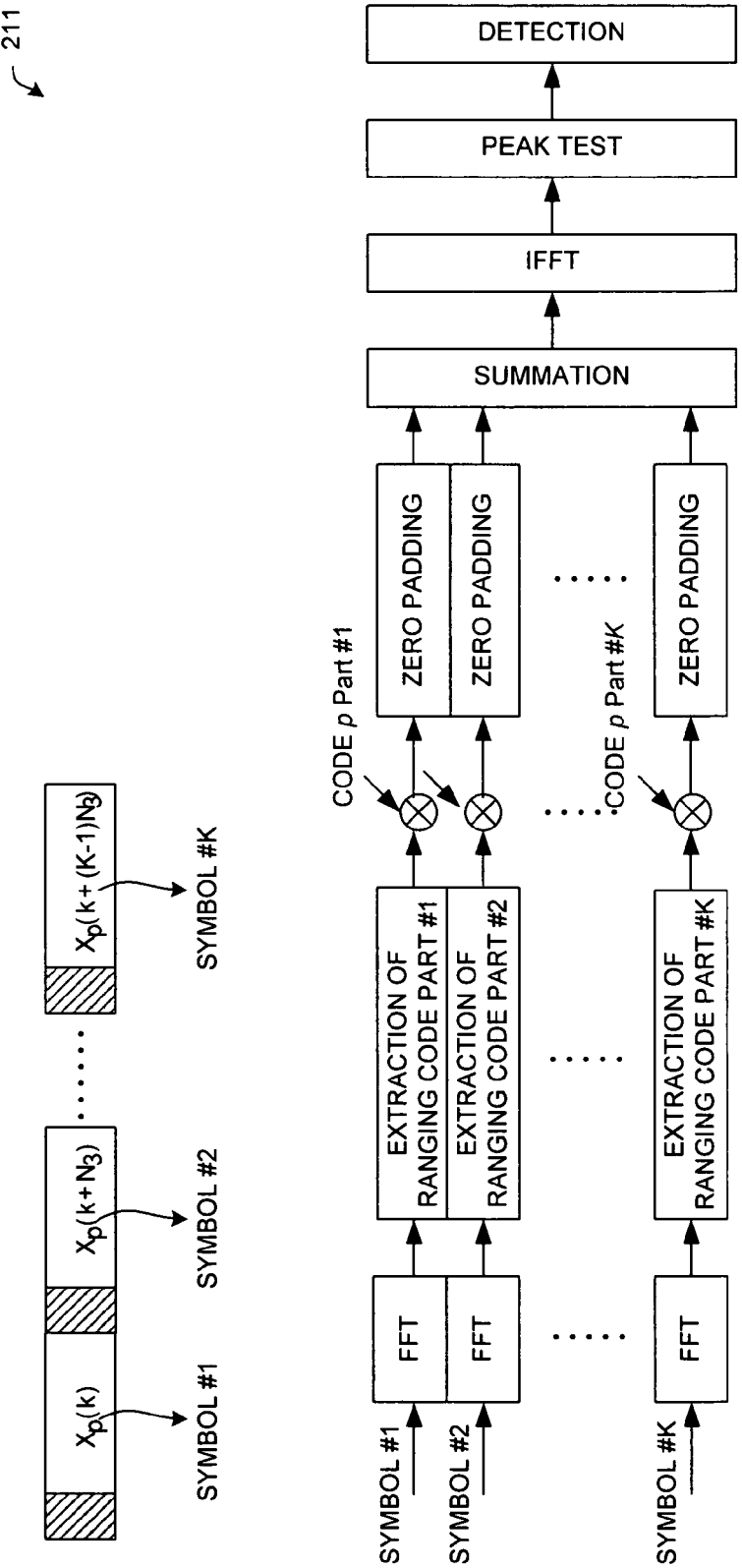

FIG. 21 illustrates a second embodiment of a decoder 211 of a base station in accordance with one novel aspect. Decoder 211 is similar to decoder 201 of FIG. 20. In the example of FIG. 21, however, the summation module is placed before the IFFT module such that only one IFFT module is required in decoder 211.

Figure 22:
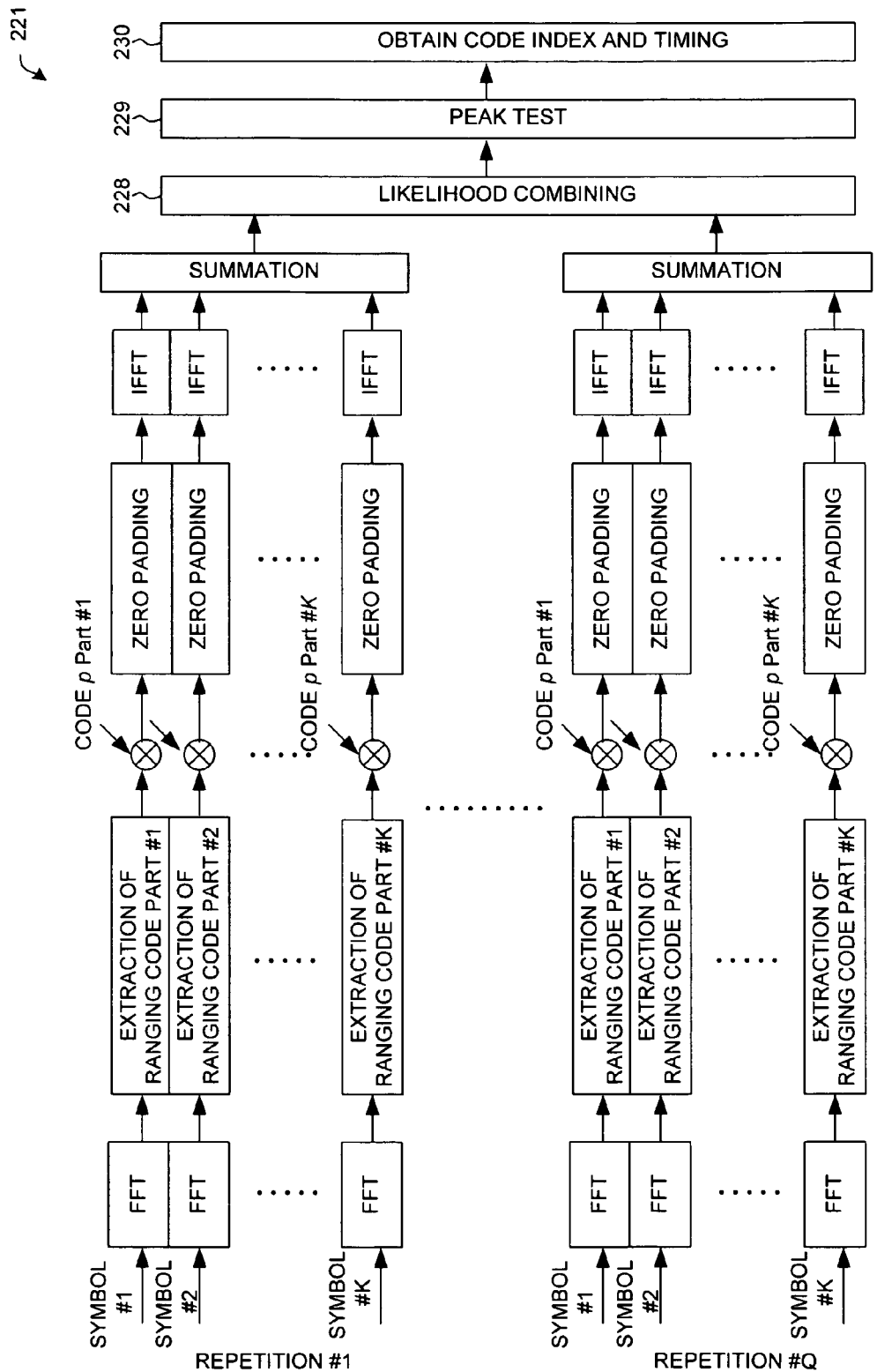

FIG. 22 illustrates a third embodiment of a decoder 221 of a base station in accordance with one novel aspect. In the example of FIG. 22, the ranging code sequence $X_P$ is repeated in time domain for Q times. Each repeated ranging code sequence $X_P$ is independently decoded by decoder 221 as by decoder 201 of FIG. 20. A number of (i.e. Q) likelihood vectors of each $X_P$ repetition for each code index P is outputted by a corresponding summation module, the Q likelihood vectors of all $X_P$ repetitions are then added one-by-one on the corresponding index again by a likelihood-combining module 228 for each code index P. The likelihood-combining module 228 thus outputs a final likelihood vector of the ranging code sequence $X_P$ for a particular code index P. The peak value of each final likelihood vector is then normalized by peak test module 229. Finally, detection module 230 identifies the actual code index of the transmitted ranging code and estimates the timing offset for uplink synchronization.

Figure 23:
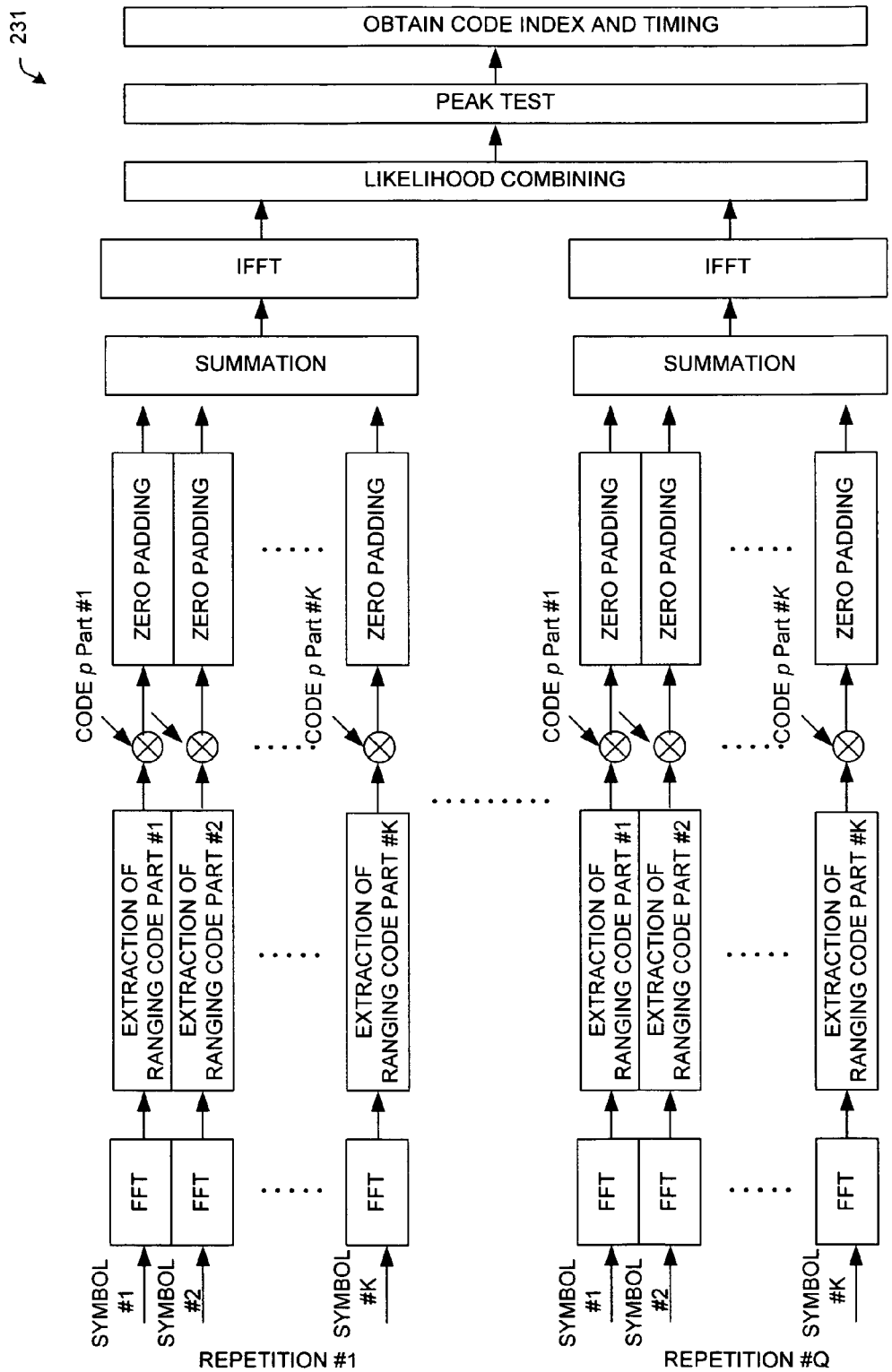

FIG. 23 illustrates a fourth embodiment of a decoder 231 of a base station in accordance with one novel aspect. In the example of FIG. 23, the ranging code sequence $X_P$ is also repeated in time domain for Q times. Decoder 231 is similar to decoder 221 of FIG. 22. In the example of FIG. 23, however, the summation module is placed before the IFFT module such that only one IFFT module is required in decoder 231 for each repetition of ranging code sequence $X_P$.

Although the present invention has been described in connection with certain specific embodiments for instructional purposes, the present invention is not limited thereto. For example, in some industrial specifications, such as 3GPP specifications, femto base station is referred to Home eNB (HeNB). In some industrial specification, the ranging channel is also called random access channel (RACH), which is used to conduct similar procedures. Accordingly, various modifications, adaptations, and combinations of various features of the described embodiments can be practiced without departing from the scope of the invention as set forth in the claims.

What is claimed is:

1. A method of uplink synchronization in a cellular OFDMA system, the method comprises:
   mapping a ranging code onto a unified synchronous ranging channel by a mobile station, wherein the unified synchronous ranging channel has a ranging cyclic prefix (RCP) length, and wherein the RCP length of the ranging channel is the same as a cyclic prefix (CP) length of a data channel; and transmitting the unified synchronous ranging channel to a base station, wherein the unified synchronous ranging channel is used in either non-synchronous or synchronous ranging procedures.

2. The method of claim 1, wherein the unified synchronous ranging channel is used for initial ranging.

3. The method of claim 1, wherein the unified synchronous ranging channel is used for handover ranging.

4. The method of claim 1, wherein the unified synchronous ranging channel is used for periodic ranging.

5. The method of claim 1, wherein the unified synchronous ranging channel is used for bandwidth request ranging.

6. The method of claim 1, wherein the base station is a femto base station.

7. The method of claim 1, wherein the unified synchronous ranging channel is used for periodic ranging between the mobile station and a macro base station.

8. The method of claim 1, wherein the ranging code is mapped onto a frequency-time radio resource region of the unified synchronous ranging channel.

9. A mobile station, comprising:
a radio frequency (RF) module that maps a ranging code onto a unified synchronous ranging channel in a cellular OFDMA system, wherein the unified synchronous ranging channel has a ranging cyclic prefix (RCP) length, and wherein the RCP length of the ranging channel is the same as a cyclic prefix (CP) length of a data channel; and
a transmitter that transmits the unified synchronous ranging channel to a base station, wherein the unified synchronous ranging channel is used in either non-synchronous or synchronous ranging procedures for uplink synchronization.

10. The mobile station of claim 9, wherein the unified synchronous ranging channel is used for one of an initial ranging, a handover ranging, a periodic ranging, and a bandwidth request ranging.

11. The mobile station of claim 10, wherein the base station is a femto base station.

12. The mobile station of claim 9, wherein the unified synchronous ranging channel is used for periodic ranging between the mobile station and a macro base station.

13. The mobile station of claim 9, wherein the ranging code is mapped onto a frequency-time radio resource region of the unified synchronous ranging channel.

14. A cellular OFDMA system, comprising:
a femto base station that allocates a first plurality of synchronous ranging channels in the cellular OFDMA system, wherein the first plurality of synchronous ranging channel is used for non-synchronous and synchronous ranging procedures by the femto base station; and
a macro base station that allocates a second plurality of synchronous ranging channels in the cellular OFDMA system, wherein the second plurality of synchronous ranging channels is used for synchronous ranging procedures by the macro base station.

15. The system of claim 14, wherein the first plurality of synchronous ranging channels and the second plurality of ranging channels are allocated in the same frequency-time radio resource regions.

16. The system of claim 14, wherein the first plurality of synchronous ranging channels are allocated more often than the second plurality of synchronous channels, and wherein the first plurality of synchronous ranging channels and the second plurality of ranging channels are allocated in different frequency-time radio resource regions.

17. The system of claim 14, wherein the first plurality of synchronous ranging channels are allocated more often than the second plurality of synchronous channels, and wherein the first plurality of synchronous ranging channels and the second plurality of ranging channels are partially allocated in the same frequency-time radio resource regions and partially allocated in different frequency-time radio resource regions.

18. The system of claim 14, wherein the size of each of the first plurality of synchronous ranging channels is the same as the size of each of the second plurality of synchronous ranging channels.

19. The system of claim 14, wherein the size of each of the first plurality of synchronous ranging channels is different from the size of each of the second plurality of synchronous ranging channels.

20. The system of claim 14, wherein the first plurality of synchronous ranging channels is used for one of an initial ranging, a handover ranging, and a periodic ranging.

21. The system of claim 14, wherein the second plurality of synchronous ranging channels is used for periodic ranging.

* * * * *